(12) United States Patent
Lin

(10) Patent No.: US 9,568,297 B2
(45) Date of Patent: Feb. 14, 2017

(54) PROTRACTOR

(71) Applicant: Feng Lin, Zhongshan (CN)

(72) Inventor: Feng Lin, Zhongshan (CN)

( * ) Notice: Subject to any disclaimer, the term of this patent is extended or adjusted under 35 U.S.C. 154(b) by 91 days.

(21) Appl. No.: 14/745,984

(22) Filed: Jun. 22, 2015

(65) Prior Publication Data

US 2016/0320168 A1 Nov. 3, 2016

(30) Foreign Application Priority Data

Apr. 29, 2015 (CN) .......................... 2015 1 0210920

(51) Int. Cl.
*G01B 3/56* (2006.01)

(52) U.S. Cl.
CPC ..................... *G01B 3/563* (2013.01)

(58) Field of Classification Search
CPC ............. G01B 3/56; G01B 3/563; B43L 7/00; B43L 7/10; B43L 7/12
USPC .......................................................... 33/424
See application file for complete search history.

(56) References Cited

U.S. PATENT DOCUMENTS

| | | | | |
|---|---|---|---|---|
| 2,689,406 A | * | 9/1954 | Stromquist ............... | B43L 7/12 33/495 |
| 2,920,392 A | * | 1/1960 | Stromquist ............ | G01B 3/563 33/424 |
| 3,426,434 A | * | 2/1969 | Zarling ................... | B43L 7/027 33/424 |
| 3,672,065 A | * | 6/1972 | Voss ...................... | B23Q 17/225 33/642 |
| 4,060,900 A | * | 12/1977 | Greenwood ........... | G01B 3/563 33/471 |
| 5,117,560 A | * | 6/1992 | Nevins ...................... | B43L 7/10 33/424 |
| 6,725,555 B1 | * | 4/2004 | Moore ..................... | B25H 7/00 33/423 |
| 2008/0052939 A1 | * | 3/2008 | Kozlowski ............. | G01B 3/563 33/536 |

FOREIGN PATENT DOCUMENTS

CN 204142117 U 2/2015

* cited by examiner

*Primary Examiner* — Yaritza Guadalupe-McCall
(74) *Attorney, Agent, or Firm* — Endurance Law Group, PLC

(57) ABSTRACT

A protractor comprising an angle scale provided with a dial gauge with a circle center, one end of the bottom edge being connected with a first side edge, and the first side edge and the bottom edge forming an included angle, and the angle of the included angle being 135 degrees; a right angle rocker arm, comprising a reading arm part and a tail arm part forming a right angle with the reading arm part, the right angle rocker arm rotating relative to the angel scale such that a first edge of the tail arm part and the bottom edge form a first change included angle, the value of the first change included angle being read by means of the reading arm part and the dial gauge; and a locking structure for rotationally connecting the angle scale and the right angle rocker arm.

10 Claims, 3 Drawing Sheets

PROTRACTOR

BACKGROUND OF THE INVENTION

Field of the Invention

The invention relates to angle measuring tools, in particular to a tool capable of measuring full angles of an external corner and an internal corner.

Description of Related Art

In current industries of equipment manufacturing, teaching and scientific research and the like, angle measurement of product members is a common operation, but the full angle of an external corner (external protruding corner of a product) and an internal corner (internal corner inside a product) cannot be measured by adopting an existing protractor. Even when this can be achieved, the manufacturing process and assisting tooling structure of the protractor are very complex, leading to relatively high manufacturing cost and use cost. Existing full angle measuring tools, such as a full circle protractor disclosed in Chinese Patent Application (Publication Number CN204142117U), comprise a front scaleplate, a back scaleplate, a radius ruler and a semicircle ruler, wherein the semicircular ruler is smaller than the scaleplates in radius; the semicircle ruler is clamped between the two scaleplates; and the radius ruler is fixed between the scaleplates by a rivet. The semicircle ruler is provided with a chute which is provided with a slider having a pen hole. The semicircle ruler is provided with patterned modules, certain number of corresponding patterned modules with specified size need to be made first, and sample plates of different angles can be used for only once, so that a considerable amount of manpower and material resources are wasted; and such full circle protractor is more suitable for planar drawing and cannot be used for measuring full angles of the external corner and internal corner of a physical product.

Therefore, the invention develops a protractor capable of measuring full angles of the external corner and the internal corner.

BRIEF SUMMARY OF THE INVENTION

The invention aims to solve the technical problems by providing a protractor which has a simple structure, is greatly reduced in material, process, use and maintenance cost, and is capable of measuring any angle of the external corner and internal corner of the product by adopting cooperation between the edge of an angle scale and a right angle and then reading a dial gauge. Therefore, the protractor is a product with excellent performances both in technicality and economy.

In order to realize the above-mentioned aims, the technical scheme adopted by the invention is a protractor which comprises an angle scale, a right angle rocker arm and a locking structure for rotationally connecting the angle scale and the right angle rocker arm;

the angle scale is provided with a dial gauge with a circle center, and the bottom edge of the angel scale is parallel with a horizontal angle scale of the dial gauge; one end of the bottom edge is connected with a first side edge, and the first side edge and the bottom edge form an included angle; and the angle of the included angle is 135 degrees;

the right angle rocker arm comprises a reading arm part and a tail arm part forming a right angle with the reading arm part, the right angle rocker arm rotates relative to the angel scale such that a first edge of the tail arm part and the bottom edge form a first change included angle, and value of the first change included angle may be read by means of the reading arm part and the dial gauge;

the tail arm part comprises a second edge arranged parallel with the first edge, the right angle rocker arm rotates relative to the angel scale such that the second edge and the first side edge form a second change included angle, and value of the second change included angle may be read by means of the reading arm part and the dial gauge.

In one or more embodiments of the invention, the locking structure comprises a shaft arranged on the angle scale; a hole formed in the right angle rocker arm, wherein the hole sleeves on the shaft and may rotate around a center of the shaft, and the shaft center coincides with the circle center; and a fastener mated with the shaft, wherein the right angle rocker arm and the angle scale switch between a locked state and a loosened state by means of the fastener.

In one or more embodiments of the invention, the dial gauge is formed by winding some circles of scale marks or a circle of scale mark or multiple circles of scale marks around the circle center.

In one or more embodiments of the invention, the reading arm part is provided with a reading edge connected with the first edge, and the reading edge intersects with the circle center.

In one or more embodiments of the invention, the angle scale is provided with a second side edge connected with the first side edge, and the first side edge and the second side edge form a right angle.

In one or more embodiments of the invention, the angle scale is provided with a top edge parallel with the bottom edge; one end of the top edge is connected with the second side edge, the other end of the top edge is connected with a third side edge, the third side edge is connected with a fourth side edge, the fourth side edge is connected with the bottom edge, and the first side edge and the third side edge are parallel; and the second side edge and the fourth side edge are parallel.

In one or more embodiments of the invention, the hole is positioned in the reading arm part, and the reading edge intersects with the central line of the hole.

In one or more embodiments of the invention, the shaft is provided with an external thread section, the fastener is provided with an internal thread hole, and the internal thread hole of the fastener and the external thread section are screwed tight and fixed.

In one or more embodiments of the invention, the height from the central line of the hole to the first edge is equal to the height from the axis to the bottom edge.

In one or more embodiments of the invention, the height from the central line of the hole to the second edge is equal to the height from the axis to the first side edge.

Compared with the prior art, the invention provides the following beneficial effects.

By adopting the above-mentioned technical scheme, the invention has a simple structure, is greatly reduced in material, process, use and maintenance cost, and is capable of measuring any angle of the external corner and internal corner of the product by adopting cooperation between the edge of the angle scale and the right angle and then reading the dial gauge; the right angle rocker arm rotates relative to the angle scale to form the first change included angle between the first edge of the tail arm part and the bottom edge, and value of the first change included angle may be read by means of the reading arm part and the dial gauge; and the first change included angle may be more suitable for actually measuring the external corner of the product, can be read directly, is simple in operation and has no reading dead angle. The right angle rocker arm rotates relative to the angle scale to form the second change included angle between the second edge and the first side edge, and value of the second change included angle can be read by means of the reading arm part and the dial gauge; and the first change included angle may be more suitable for actually measuring the internal corner of the product, can be read directly, is simple in operation and has no reading dead angle. According to different orientation of the product and angles to be measured, the right angle rocker arm can be combined with the first side edge or the second side edge or the third side edge or the fourth side edge or the top edge or the bottom edge for omnibearing measurement and transformation. Therefore, the protractor is a product with excellent performances both in technicality and economy.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 1:
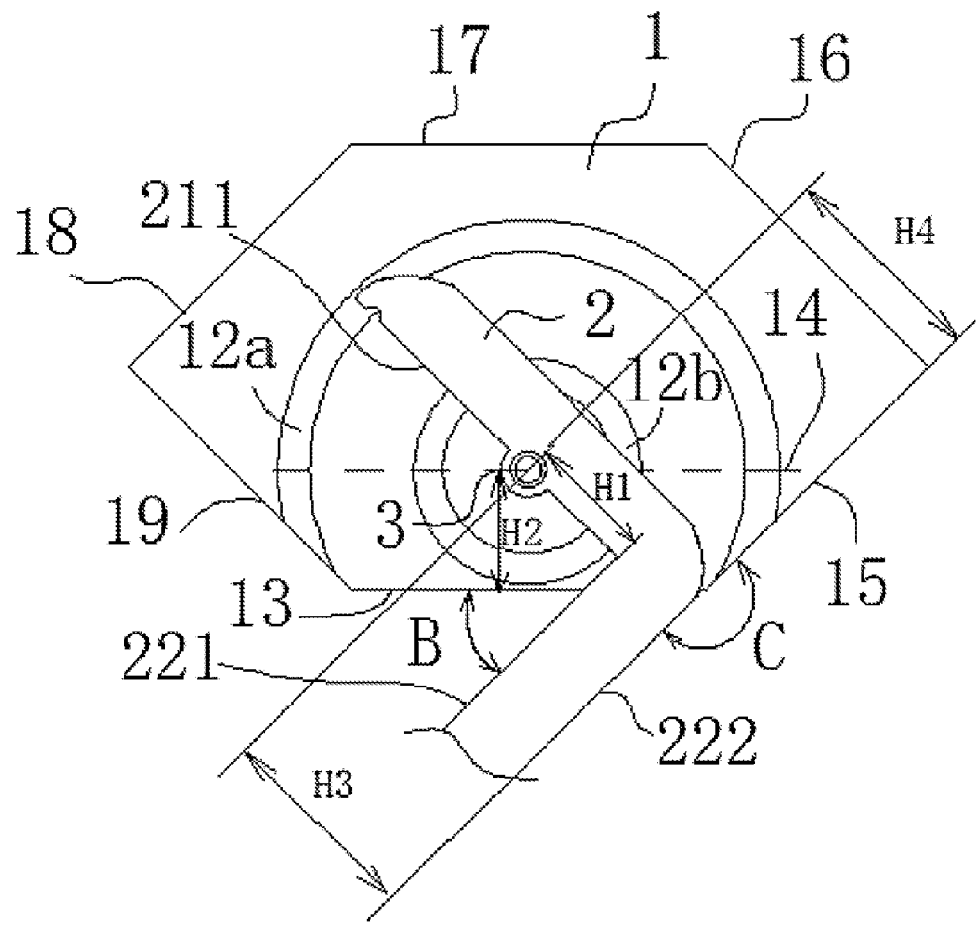
FIG. 1 is a structural diagram of a protractor in an embodiment of the invention.

Embodiments of the invention will be described in detail below, examples of the embodiments are shown in Figures, and same or similar reference numbers represent same or similar elements or elements with same or similar functions throughout the Figures.

In the description of the invention, it should be noted that for nouns of locality, such as terms of "center", "transverse", "longitudinal', "length", "width", "thickness", "upper", "lower", "front", "back", "left", "right", "vertical", "horizontal", "top", "bottom", "inner", "outer", "clockwise", "counterclockwise" and the like for indicating direction and positional relationships are based on direction or positional relationships shown in the Figures, are merely provided for ease of illustration and simplicity of the description of the present invention, rather than indicating or suggesting that the devices or elements must have specific locations, or are constructed or operated in specific orientations, and are not understood as limiting the specific protection scope of the invention.

In addition, terms, "first" and "second" are used for describing, and are not understood as indicating or suggesting relative importance or implying the number technical features. Therefore, features defined by "first" and "second" may indicate or imply that one or more such features are contained, and in the description of the invention, "a plurality of" means two or more than two, unless otherwise specified.

In the invention, unless otherwise expressly specified and defined, terms such as "assembled", "coupled" and "connected" should be understand in a broad sense, for example, fixedly connected, detachably connected or integrally connected; or mechanically connected; or coupled directly or through an intermediate, or two elements communicated internally. For common skilled in the art, specific meaning of the terms in the invention should be understood according to specific condition.

In the invention, unless otherwise specified and defined, a first feature being "above" or "below" a second feature includes the conditions that the first and second features are in direct contact, or the first feature and the second feature are not in direct contact, but are contacted through another feather therebetween. In addition, the first feature being "above", "below" and "on" the second feature involves the conditions that the first feature is directly above or obliquely above the second feature, or merely indicates that the first feature is higher than the second feature in height. The first feature being "above", "below" and "under" the second feature includes the conditions that the first feature is directly below or obliquely below the second feature or merely indicates that the first feature is lower than the second feature in height.

In order to make technical scheme and beneficial effects of the embodiments of the invention apparent and clear, the specific embodiments of the invention will be further described in combination with the drawings of the invention. The embodiments described by referring to drawings are exemplary, and aim at explaining the invention, rather than limiting the invention.

Figure 2:
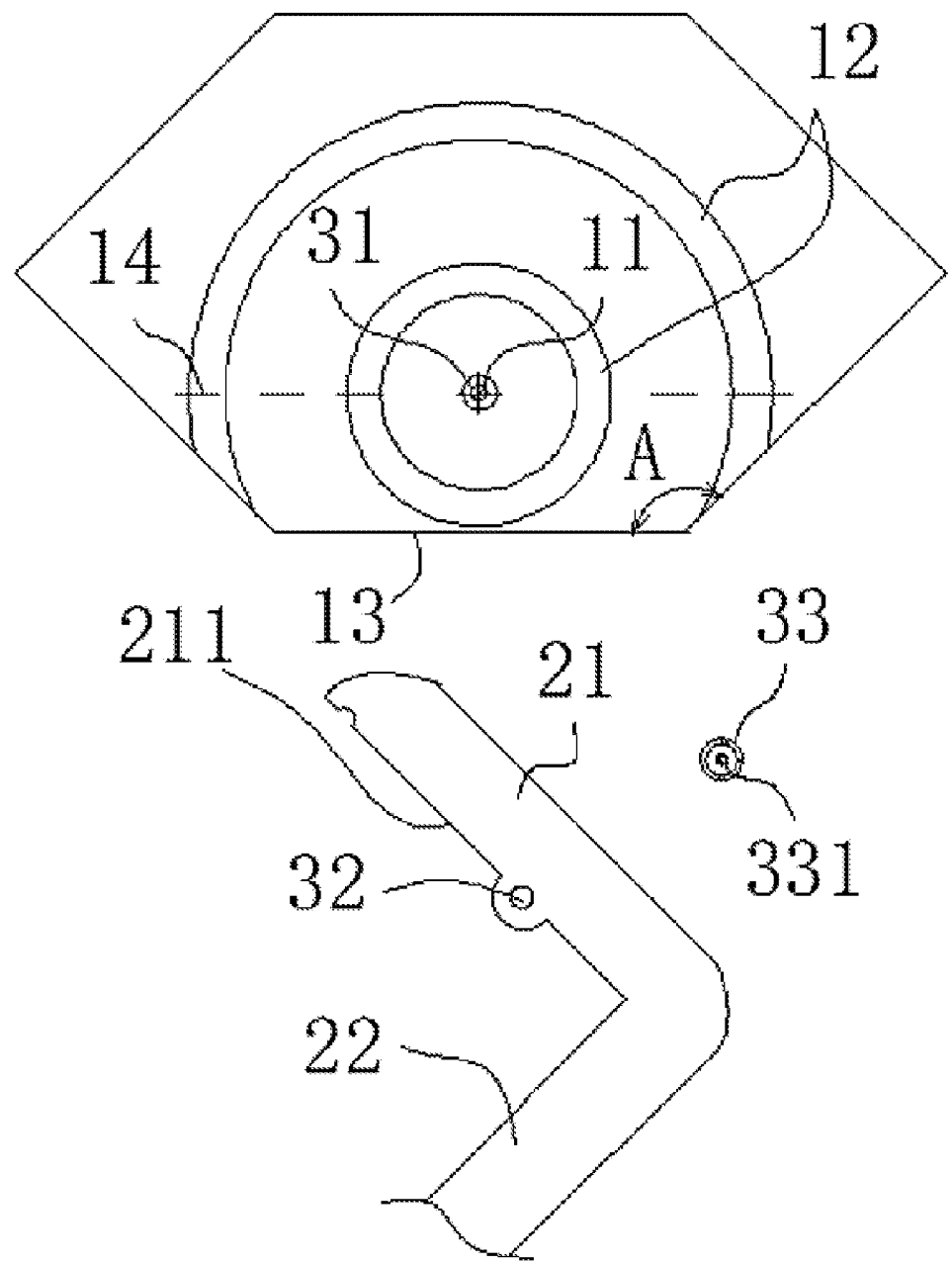
FIG. 2 is an expanded diagram of FIG. 1.
Figure 3:
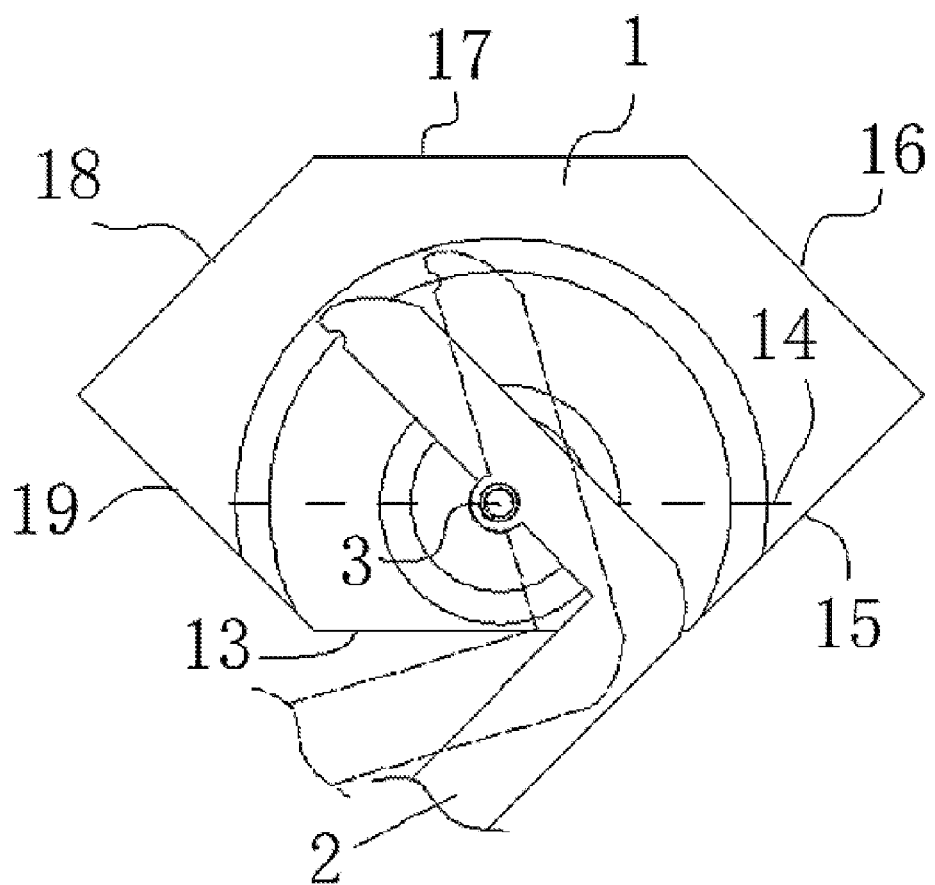
FIG. 3 is a schematic diagram of a protractor in use.

Referring to FIGS. 1-3, the preferable embodiments of the invention are a protractor, wherein the protractor comprises an angle scale 1, a right angle rocker arm 2 and a locking structure 3 for rotationally connecting the angle scale 1 and the right angle rocker arm 2.

The angle scale 1 is provided with a dial gauge 12 with a circle center 11, and the bottom edge 13 of the angel scale 1 is parallel with a horizontal angle scale 14 of the dial gauge 12; one end of the bottom edge 13 is connected with a first side edge 15, and the first side edge 15 and the bottom edge 13 form an included angle A; and the angle of the included angle A is 135 degrees.

The right angle rocker arm 2 comprises a reading arm part 21 and a tail arm part 22 forming a right angle with the reading arm part 21, the right angle rocker arm 2 rotates relative to the angel scale 1 such that a first edge 221 of the tail arm part 22 and the bottom edge 13 form a first change included angle B, and value of the first change included angle B may be read by means of the reading arm part 21 and the dial gauge 12; during actual measurement, the first change included angle B is used for measuring the external corner in the product.

The tail arm part 22 comprises a second edge 222 parallel with the first edge 221, the right angle rocker arm 2 rotates relative to the angel scale 1 such that the second edge 222 and the first side edge 15 form a second change included angle C, and value of the second change angle C may be read by means of the reading arm part 21 and the dial gauge 12. During actual measurement, the first change included angle C is used for measuring the internal external corner in the product.

In the embodiment, the locking structure 3 comprises a shaft 31 arranged on the angle scale 1; a hole 32 formed in the right angle rocker arm 2, wherein the hole 32 sleeves on the shaft 31 and can rotate around a center of the shaft 31, and the shaft center coincides with the circle center 11; and a fastener 33 mated with the shaft, wherein the right angle rocker arm 2 and the angle scale 1 switch between a locked state and a loosened state by means of the fastener 33.

The dial gauge 21 is formed by winding some circle of scale marks 12a or a circle of scale mark 12b or multiple circles of scale marks (not shown in Figure) around the circle center 11.

The reading arm part 21 is provided with a reading edge 211 connected with the first edge 221, and the reading edge 211 and the circle center 11 are intersected so as to ensure precise reading.

The angle scale 1 is provided with a second side edge 16 connected with the first side edge 15, and the first side edge 15 and the second side edge 16 form a right angle.

The angle scale 1 is provided with a top edge 17 parallel with the bottom edge 13; one end of the top edge 17 is connected with the second side edge 16, the other end of the top edge is connected with a third side edge 18, the third side edge 18 is connected with a fourth side edge 19, the fourth side edge 19 is connected with the bottom edge 13, and the first side edge 15 and the third side edge 17 are parallel; and the second side edge 16 and the fourth side edge 19 are parallel.

The hole 32 is positioned in the reading arm part 21, and the reading edge 211 and the central line of the hole 32 are intersected.

The shaft 31 is provided with an external thread section (not shown), the fastener 33 is provided with an internal thread hole 331, and the internal thread hole 331 of the fastener 33 and the external thread section are screwed tight and fixed.

The height H1 from the central line of the hole 32 to the first edge 221 is equal to the height H2 from the axis to the bottom edge.

The height H3 from the central line of the hole 32 to the second edge 222 is equal to the height H4 from the axis to the first side edge 12.

In the description of the specification, description of reference terms "one embodiment", "preferably", "examples", "specific examples", "some examples" or the like refer to specific feature, structure, material or characteristic described in combination with the embodiments or examples, are contained in at least one embodiment or example of the invention, and schematic expression for the terms in the description do not refer to the same embodiments or examples. In addition, the described specific feature, structure, material or characteristic can be properly combined in any one or more embodiments or examples.

Form the description of the structure and principle, those skilled in the art should understand that the invention is not limited to the specific embodiments. Improvement and alternation adopting the well-known technology in the art based on the invention should fall within the protection scope of the invention and be defined by all claims.

What is claimed is:

1. A protractor, comprising:
   an angle scale, provided with a dial gauge with a circle center, wherein a bottom edge of the angel scale is parallel with a horizontal angle scale of the dial gauge, one end of the bottom edge is connected with a first side edge, the first side edge and the bottom edge form an included angle, and the angle of the included angle is 135 degrees;
   a right angle rocker arm, comprising a reading arm part and a tail arm part forming a right angle with the reading arm part, wherein the right angle rocker arm rotates relative to the angel scale such that a first edge of the tail arm part and the bottom edge form a first change included angle, and the value of the first change included angle is read by means of the reading arm part and the dial gauge; and
   a locking structure, for rotationally connecting the angle scale and the right angle rocker arm;
   wherein the tail arm part comprises a second edge parallel with the first edge, wherein the right angle rocker arm rotates relative to the angel scale such that the second edge and the first side edge form a second change included angle, and the value of the second change angle is read by means of the reading arm part and the dial gauge.

2. The protractor according to claim 1, wherein the locking structure comprises:
   a shaft arranged on the angle scale;
   a hole formed in the right angle rocker arm, wherein the right angle rocker arm sleeves on the shaft by means the hole so as to rotate around the center of the shaft, and the shaft center and the circle center are coincided; and
   a fastener mated with the shaft, by means of which the right angle rocker arm and the angle scale switch between a locked state and a loosened state.

3. The protractor according to claim 2, wherein the reading arm part has a reading edge connected with the first edge, and the reading edge and the circle center are intersected.

4. The protractor according to claim 3, wherein the angle scale has a second side edge connected with the first side edge, and the first side edge and the second side edge form a right angle.

5. The protractor according to claim 4, wherein the angle scale has a top edge parallel with the bottom edge, one end of the top edge is connected with the second side edge, the other end of the top edge is connected with a third side edge, the third side edge is connected with a fourth side edge, the fourth side edge is connected with the bottom edge, the first side edge and the third side edge are parallel, and the second side edge and the fourth side edge are parallel.

6. The protractor according to claim 4, wherein that the hole is positioned in the reading arm part, and the reading edge and the central line of the hole are intersected.

7. The protractor according to claim 4, wherein that the shaft is provided with an external thread section, the fastener is provided with an internal thread hole, and the internal thread hole of the fastener and the external thread section are screwed tight and fixed.

8. The protractor according to claim 2, wherein that the height from the central line of the hole to the first edge is equal to the height from the axis to the bottom edge.

9. The protractor according to claim 8, wherein the height from the central line of the hole to the second edge is equal to the height from the axis to the first side edge.

10. The protractor according to claim 1, wherein the dial gauge is formed by a part of a circle of scale marks or a circle of scale marks or a plurality of circles of scale marks around the circle center.

* * * * *